US 6,744,946 B2
Jun. 1, 2004

(12) United States Patent
Kikinis

(10) Patent No.: US 6,744,946 B2
(45) Date of Patent: Jun. 1, 2004

(54) MULTIPLE METHODS AND SYSTEMS FOR CONNECTING OR TAPPING INTO FIBER OPTICS

(75) Inventor: Dan Kikinis, Saratoga, CA (US)

(73) Assignee: Lextron Systems, Inc., Saratoga, CA (US)

(*) Notice: Subject to any disclaimer, the term of this patent is extended or adjusted under 35 U.S.C. 154(b) by 222 days.

(21) Appl. No.: 10/299,613

(22) Filed: Nov. 18, 2002

(65) Prior Publication Data
US 2003/0095750 A1 May 22, 2003

Related U.S. Application Data

(63) Continuation of application No. 09/877,554, filed on Jun. 8, 2001, now Pat. No. 6,519,391.
(60) Provisional application No. 60/211,241, filed on Jun. 12, 2000.

(51) Int. Cl.[7] .................................................. G02B 6/28
(52) U.S. Cl. ............................. 385/24; 385/40; 385/42; 385/100
(58) Field of Search .......................... 385/24, 42, 100, 385/46, 104, 49, 27, 31, 126

(56) References Cited

U.S. PATENT DOCUMENTS 5,448,669 A * 9/1995 Dunn et al. ................. 385/101

OTHER PUBLICATIONS

U.S. patent application Ser. No. 09/877,554, Kikinis.

U.S. provisional application Ser. No. 60/211,241, Kikinis.

* cited by examiner

Primary Examiner—Robert H. Kim
Assistant Examiner—Richard Kim
(74) Attorney, Agent, or Firm—Donald R. Boys; Central Coast Patent Agency, Inc.

(57) ABSTRACT

An apparatus for interfacing optical signals to an optical fiber has a layered interface element with a first electrically conductive layer defining a first surface, a photoactive material layer in intimate contact with the first layer on a second surface opposite the first surface, a second electrically conductive layer in intimate contact with the photoactive material layer, confining the photoactive material layer between the first and second electrically conductive layers, and a third surface angularly disposed to the first surface and intersecting the photoactive material layer; and a pressure element having a contact surface translatable toward the first surface of the interface element, to urge an optical fiber positioned across the interface element into the first surface, and by local deformation of the optical fiber also into the third surface, creating thereby an intimate contact region between an edge of the photoactive layer intersecting the third surface and the optical fiber. Indentions may be provided in a fiber to facilitate engagement of elements.

7 Claims, 6 Drawing Sheets

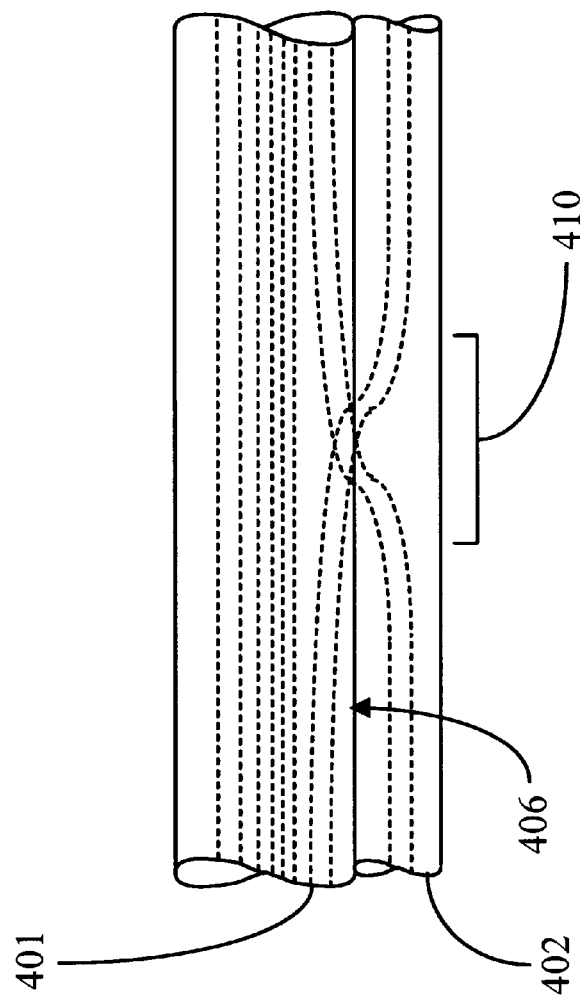
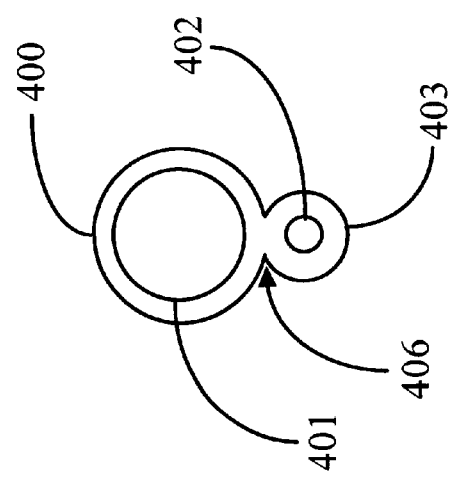
Fig. 4b
Fig. 4a

MULTIPLE METHODS AND SYSTEMS FOR CONNECTING OR TAPPING INTO FIBER OPTICS

This application claims the benefit of provisional application Ser. No. 60/211,241 filed Jun. 12, 2000.

The present application is a continuation application of patent application Ser. No. 09/877,554, entitled "Multiple Methods and Systems for Connecting or Tapping Into Fiber Optics," which was filed on Jun. 8, 2001 now U.S. Pat No. 6,519,391, which is incorporated herein in its entirety.

BACKGROUND OF THE INVENTION

One of the biggest problems in installing fiber-optics systems, wherein data is communicated in fiber-optic cables, is the necessity for providing one cable for a number of homes or businesses, tapping into the one cable for each location, in a manner similar to the current style of telephone cable installation. Unfortunately, fiber-optic systems don't lend themselves easily to such an approach, and typically what is required is to have either one dedicated cable run to each home or business, or to make a complete splicing of a common cable for each home. Both of these options are prohibitively expensive, and in some cases, inserting full taps reduces reliability dramatically.

What is needed is a method and a system that allows creation of junctions at different positions along a fiber-optic cable inexpensively and quickly, and without compromising reliability, to allow inexpensive upgrading to fiber-optic cabling in homes, businesses, and so on.

SUMMARY OF THE INVENTION

In a preferred embodiment of the present invention an apparatus for interfacing optical signals to an optical fiber is provided, comprising a layered interface element comprising a first electrically conductive layer defining a first surface, a photoactive material layer in intimate contact with the first layer on a second surface opposite the first surface, a second electrically conductive layer in intimate contact with the photoactive material layer, confining the photoactive material layer between the first and second electrically conductive layers, and a third surface angularly disposed to the first surface and intersecting the photoactive material layer; and a pressure element having a contact surface translatable toward the first surface of the interface element, to urge an optical fiber positioned across the interface element into the first surface, and by local deformation of the optical fiber also into the third surface, creating thereby an intimate contact region between an edge of the photoactive layer intersecting the third surface and the optical fiber.

In some cases the photoactive material is a photosensitive material, and light intercepted by the photosensitive layer is converted to a voltage between the first and second conductive layers. Also in preferred embodiments there are electrodes implemented on the two electrically conductive layers, the electrodes connected to electrical circuitry for forming an electrical signal in response to the light intercepted by the photosensitive material. In still other cases there are electrodes implemented on the two conductive layers to apply voltage signals to the photoactive material layer, and the photoactive material is a material that emits light in response to the electrical signals applied, and the light emitted is edge-emitted into the optical fiber at the intimate contact region.

In some embodiments of the invention the pressure element has a resilient covering on the contact surface to avoid damage to the optical fiber placed under pressure. There may also be a plurality of separate interface elements extending from a common layered structure, the separate interface elements spaced apart by a distance related to the wave-length of light to be transmitted in an optical fiber to be interfaced to the apparatus. Still further, there is, in some embodiments, an optically-occluding covering upon each of the plurality of interface elements on a side opposite the side of the third surface. The interface element and the pressure element are preferably joined by a translation mechanism allowing translation of the pressure element toward the interface element, which may be a hinge connected to each of the interface element and the pressure element.

In another aspect of the invention a method for non-invasive interfacing of signals to an optical fiber is provided, comprising the steps of (a) forming a layered interface element comprising a first electrically conductive layer defining a first surface, a photoactive material layer in intimate contact with the first layer on a second surface opposite the first surface, a second electrically conductive layer in intimate contact with the photoactive material layer, confining the photoactive material layer between the first and second electrically conductive layers, and a third surface angularly disposed to the first surface and intersecting the photoactive material layer; and (b) urging an optical fiber positioned across the interface element into the first surface, and by local deformation of the fiber into the third surface, by a pressure element having a contact surface translatable toward the first surface of the interface element, creating thereby an intimate contact region between an edge of the photoactive layer intersecting the third surface and the optical fiber.

In some embodiments of the method the photoactive material is a photosensitive material, and light intercepted by the photosensitive layer is converted to a voltage between the first and second conductive layers. In this embodiment electrodes are implemented on the two electrically conductive layers, the electrodes connected to electrical circuitry for forming an electrical signal in response to the light intercepted by the photosensitive material.

In other embodiments the electrodes are implemented on the two conductive layers to apply voltage signals to the photoactive material layer, the photoactive material is a material that emits light in response to the electrical signals applied, and the light emitted is edge-emitted into the optical fiber at the intimate contact region.

In some cases the pressure element has a resilient covering on the contact surface to avoid damage to the optical fiber placed under pressure. There may also be a plurality of separate interface elements extending from a common layered structure, the separate interface elements spaced apart by a distance related to the wave-length of light to be transmitted in an optical fiber to be interfaced to the apparatus. In some cases as well there is an optically occluding covering upon each of the plurality of interface elements on a side opposite the side of the third surface.

In preferred embodiments the interface element and the pressure element are joined by a translation mechanism allowing translation of the pressure element toward the interface element, and the interface element may be a hinge connected to each of the interface element and the pressure element.

In another aspect of the invention an optical fiber constructed to interface to a non-invasive signal transformation apparatus is provided, the fiber comprising a substantially constant diameter along a longitudinal axis of the fiber; and indentions implemented at repeated distances along the fiber to interface the fiber to one or more layered interface elements, the interface elements each comprising a first electrically conductive layer defining a first surface, a photoactive material layer in intimate contact with the first layer on a second surface opposite the first surface, a second electrically conductive layer in intimate contact with the photoactive material layer, confining the photoactive material layer between the first and second electrically conductive layers, and a third surface angularly disposed to the first surface and intersecting the photoactive material layer. The indentions are shaped to engage the interface elements in a manner that brings an edge of the photoactive material layer into intimate contact with a region of the fiber at an angle other than at a right angle to the longitudinal axis of the fiber. In some cases individual ones of said indentions are formed on opposite sides of a diameter of the fiber.

In still another aspect of the invention a method for interfacing an optical fiber to a non-invasive layered interface element comprising a first electrically conductive layer defining a first surface, a photoactive material layer in intimate contact with the first layer on a second surface opposite the first surface, a second electrically conductive layer in intimate contact with the photoactive material layer, confining the photoactive material layer between the first and second electrically conductive layers, and a third surface angularly disposed to the first surface and intersecting the photoactive material layer is provided, the method comprising the steps of (a) forming an indention in the fiber substantially at a right angle to a longitudinal axis of the fiber, the indention shaped to contact the interface element in a first indention region with the first surface substantially parallel to the longitudinal axis of the fiber, and with the third surface and the edge of the photoactive material layer in contact with a second region of the indention, the edge of the photoactive region then facing into the fiber at an angle other than at a right angle with the longitudinal axis of the fiber; and (b) engaging the interface element with the indention. In some embodiments of this method, in step (a), indentions are formed at repeated intervals along a length of the fiber.

In still another aspect of the present invention an optical cable for N fibers to enhance selectively coupling to individual fiber pairs from the cable is provided, comprising a first core conducting N−2 of the fibers, a second core parallel to the first core, the second core at any point conducting 2 of the N fibers, the second core physically distinguishable from the first core, and crossover regions at regular intervals along the cable having openings between the cores wherein fiber pairs may switch between the first core to the second core. The cable in this aspect is characterized in that at each crossover region proceeding in one direction, a pair of fibers in the second core crosses over into the first core, and a different pair of fibers crosses over from the first core to the second core.

In a preferred embodiment, at each crossover region, a different pair of fibers enters the second core, until all fibers have been in the second core, and then the sequence repeats. In this embodiment the cable may be annotated in each region between crossover points, identifying the cable pair in the region annotated. In another embodiment each fiber is associated with an electrical conductor in a manner that all fiber pairs may be identified from without the cable.

In still another embodiment a method for facilitating selective coupling to individual fiber pairs in an optical cable carrying N fibers in a plurality of fiber pairs is provided, comprising the steps of (a) forming the cable with a first core conducting N−2 of the fibers; (b) forming a second core parallel to the first core, the second core at any point conducting 2 of the N fibers, the second core physically distinguishable from the first core; (c) providing crossover regions at regular intervals along the cable, the crossover regions having an opening between the cores wherein fiber pairs may cross over between the first core and the second core; and (d) crossing a pair of fibers from the second core to the first core, and a different pair of fibers from the first core to the second core, at each crossover point. In some cases, at each crossover region a different pair of fibers enters the second core, until all fibers have been in the second core, and then the sequence repeats. In other cases the cable is annotated in each region between crossover points, identifying the fiber pair in the region annotated.

In various embodiments of the invention, taught in enabling embodiments below, for the first time a way is provided for interfacing to optical cables without a need to cut and splice fibers of the cables in most cases.

BRIEF DESCRIPTION OF THE DRAWINGS

FIG. 2b is an enlargement of a portion of FIG. 2a.

FIG. 4a is a cross-section view of an especially constructed fiber-optic cable in an embodiment of the present invention.

FIG. 4b is a diagrammatical view to illustrate a feature of the cable of FIG. 4a.

DESCRIPTION OF THE PREFERRED EMBODIMENTS

Figure 1:
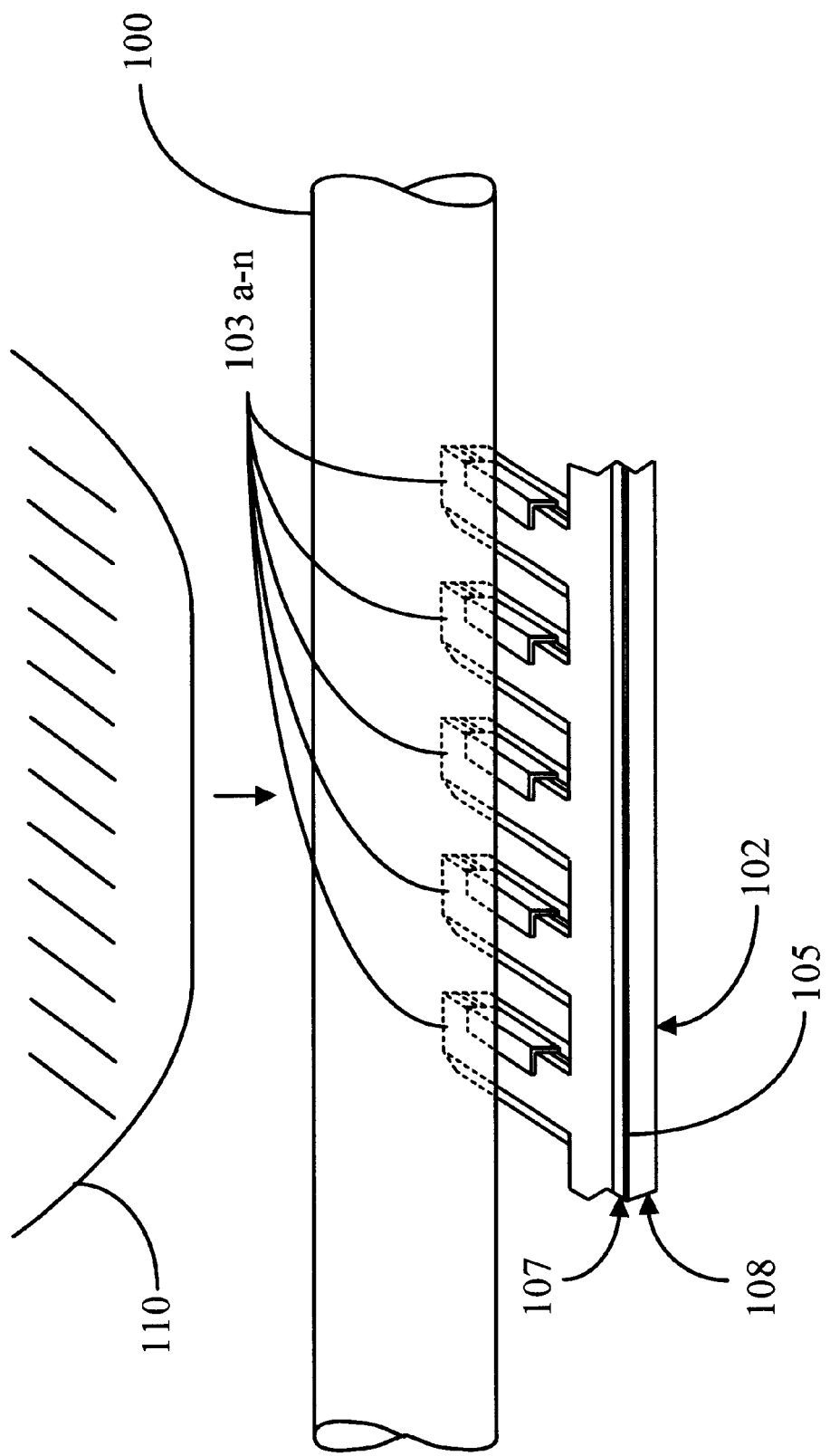
FIG. 1 is an overview of a non-invasive tap for a fiber-optic fiber according to an embodiment of the present invention.

FIG. 1 is an overview of a non-invasive tap for a fiber-optic fiber of a fiber-optic cable according to an embodiment of the present invention. Fiber-optic fiber 100 in this embodiment is tapped for optical communication without cutting the fiber.

A comb-shaped laser system 102 is provided in this embodiment having closely-spaced multiple extended elements 103a through 103n. Each of extended elements 103 forms an interface with fiber 100 without cutting or breaking the fiber, in a manner that light may be emitted into the fiber, or light may be sensed in the fiber and an electrical signal formed in response.

The spacing of elements 103 relates to the wavelength of light in fiber 100 in a manner that the separate signals provided by or received from elements 103 are reinforcing. In this example the distance is exactly Lambda of the peak wave lengths. In a typical application the spacing will be on the order of one micron or less, but not necessarily at the exact Lambda of the wavelength. This deviation is particularly important in the case of tunable laser devices, that can emit in a single wavelength within a range, at a given time. That allows a single device to address a whole range of "bands" in WDM (wavelength division multiplex) or HDWDM (High Density WDM).

In a preferred embodiment comb structure 102 is a layered conductive material having upper and lower layers 107 and 108, and a central layer 105 of an optically active material. In some preferred embodiments layers 107 and 108 are semiconducting material. Layer 105 is a photo-electric material that emits light in response to an electrical input, or a photosensitive material that provides an electrical output in response to light, depending upon whether the dedication of the system is to provide a signal to fiber 100, or read a signal from fiber 100. In a preferred embodiment an electrical signal is imposed on layer 105, or the voltage provided by layer 105 is monitored, by electrodes (+and-) implemented on layers 107 and 108. It will be apparent to the skilled artisan that comb 102 may be constructed by the layering and selective etching techniques used for manufacturing integrated circuits or solid state laser devices etc., especially in those cases in which the conductive layers are to be semiconductor material.

FIG. 1 shows optical fiber 100 positioned across extended elements 103, and a compressive element 110 is illustrated above fiber 100 for the purpose of urging the fiber downward in this example onto the extended elements 103. The purpose of the pressure applied is to deform the fiber in the locality of each extended element 103 in a manner that an optical interface is created between photoactive layer 105 in the extended elements 103 and the fiber, such that light emitted from layer 105 (edge emission) may enter the fiber at an angle with the axis of the fiber of considerably less than 90 degrees, and may thus be transmitted along the fiber. This created interface allows optical tapping to be done without breaking or cutting the fiber.

Figure 2A:
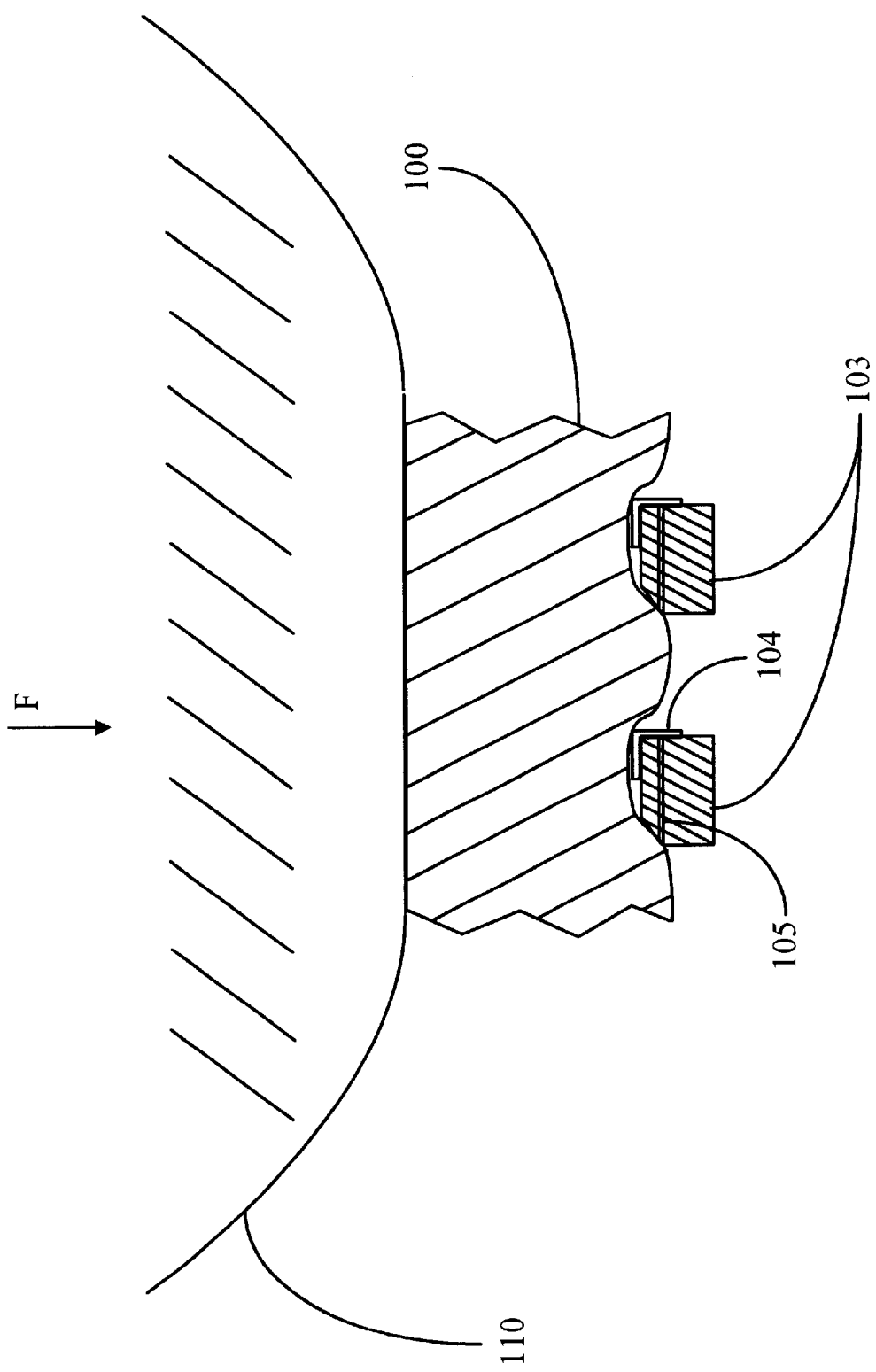
FIG. 2a is an enlarged view of a portion of the tap of FIG. 1.

FIG. 2a is an enlarged vertical section view taken along the longitudinal axis of FIG. 1, cutting two elements 103a and 103b in a vertical plane along the line of engagement with the fiber. The direction of this view is in the direction of the extension of extended elements 103 of comb structure 102. Thus urging element 110, fiber 100, and extended element 103 are all shown in cross-section. Only two of the elements 103 are shown in the section view of FIG. 2a simply to avoid redundancy and duplication. Two elements is deemed sufficient to describe the inventive aspects in enabling detail.

In FIG. 2a force F is indicated by vector urging fiber 100 into elements 103. This force may be applied in any one of a number of ways. For example, comb-like structure 102 may be a part of a larger first planar structure, or mounted to a larger first planar structure, and element 110 may be a part of a second planar structure joined to the first planar structure by a translation mechanism in a manner that the two planar structures may be closed and force applied. Preferably element 110 includes a resilient surface to avoid damaging fiber 100. The translation mechanism could be a hinge between the planar structures, for example. It is only necessary that fiber 100 be urged into elements 103 with sufficient force to cause a deformation described below. It may be seen in FIG. 2a that the fiber is somewhat deformed in the regions where the fiber is urged into the extension elements.

Figure 2B:
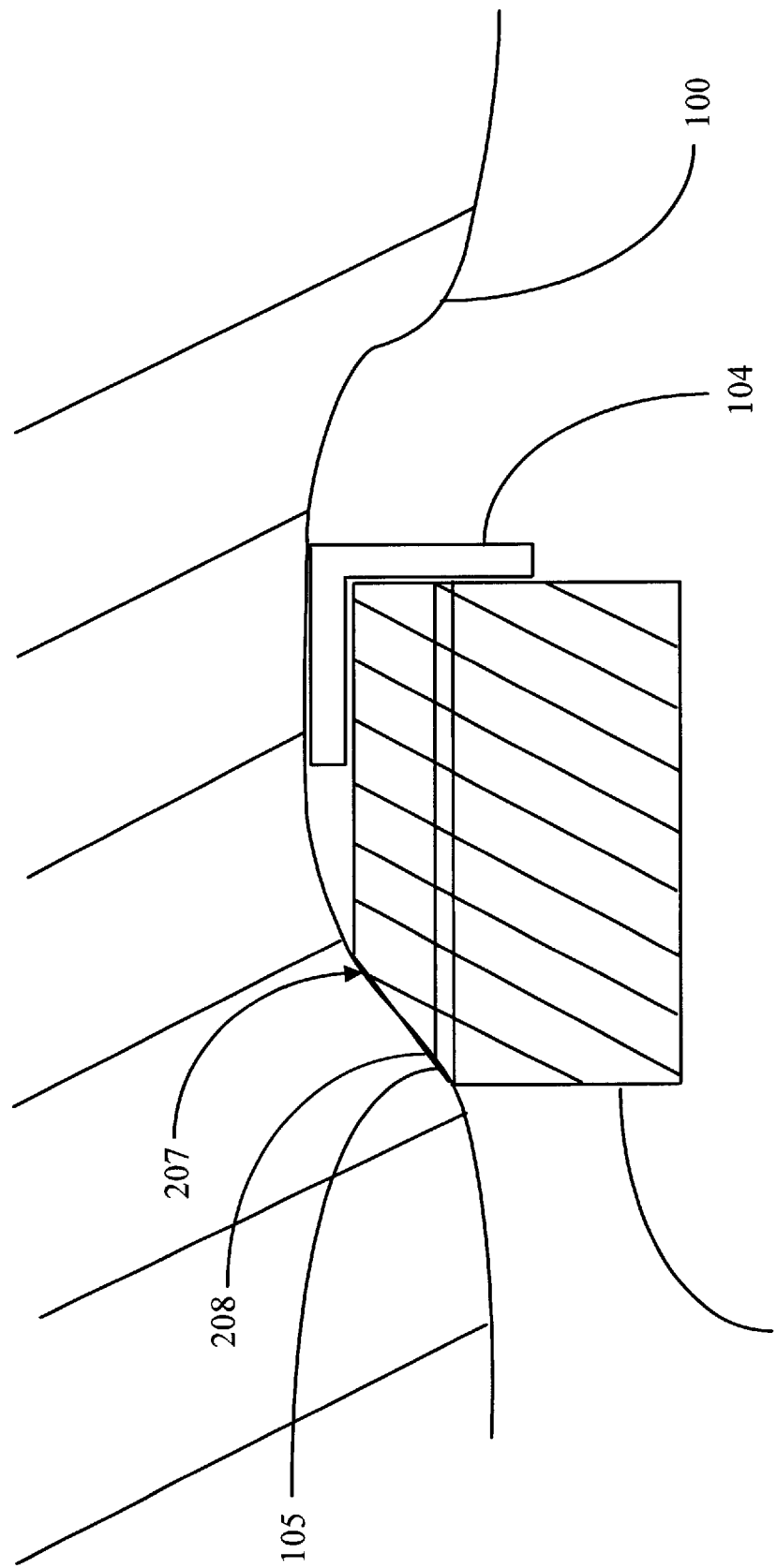

FIG. 2b is an enlarged view of one of the two elements 103 and a part of fiber 100 from FIG. 2a. Elements 103, as seen in FIGS. 2a and 2b, are shaped on one side to have an angular surface 207 from about the center of the extended element to below a point 208 where active layer 105 intersects the angled surface. Sufficient force expressed on element 110, hence on fiber 100, urging the fiber into elements 103 causes the fiber to deform locally sufficient to intimately contact angled surface 207. In some cases a liquid or gel material (optical grease) may be used in the contact region to fill any tiny voids and to facilitate small local sliding movement as the deformation is accomplished.

Once deformation is accomplished, and an intimate contact is formed between a portion of fiber 100 and layer 105 of structure 102, light edge-emitted from layer 105 will enter fiber 100 at an angle other than at right angles to the longitudinal axis of the fiber. Further, the fact of a plurality of elements 103, each forming an intimate interface with the fiber, and the spacing of the elements 103, allows any signal provided to fiber 103 to be reinforced by a factor equal to the number of elements 103. The spacing is according to the well-known Fiber Bragg Gratings Effect, which may be reviewed at the Web site reached by URL http://www.mmm.com/market/industrial/fibers/fiber_bragg.html, which is incorporated herein by reference.

The exact number of elements 103 may vary in different situations, and may be determined experimentally in some cases. An opaque shield material 104 is provided in this example at the edge of elements 103 opposite angled surface 207 to further enhance the efficiency of light transmission from elements 103 into fiber 100.

Figure 3:
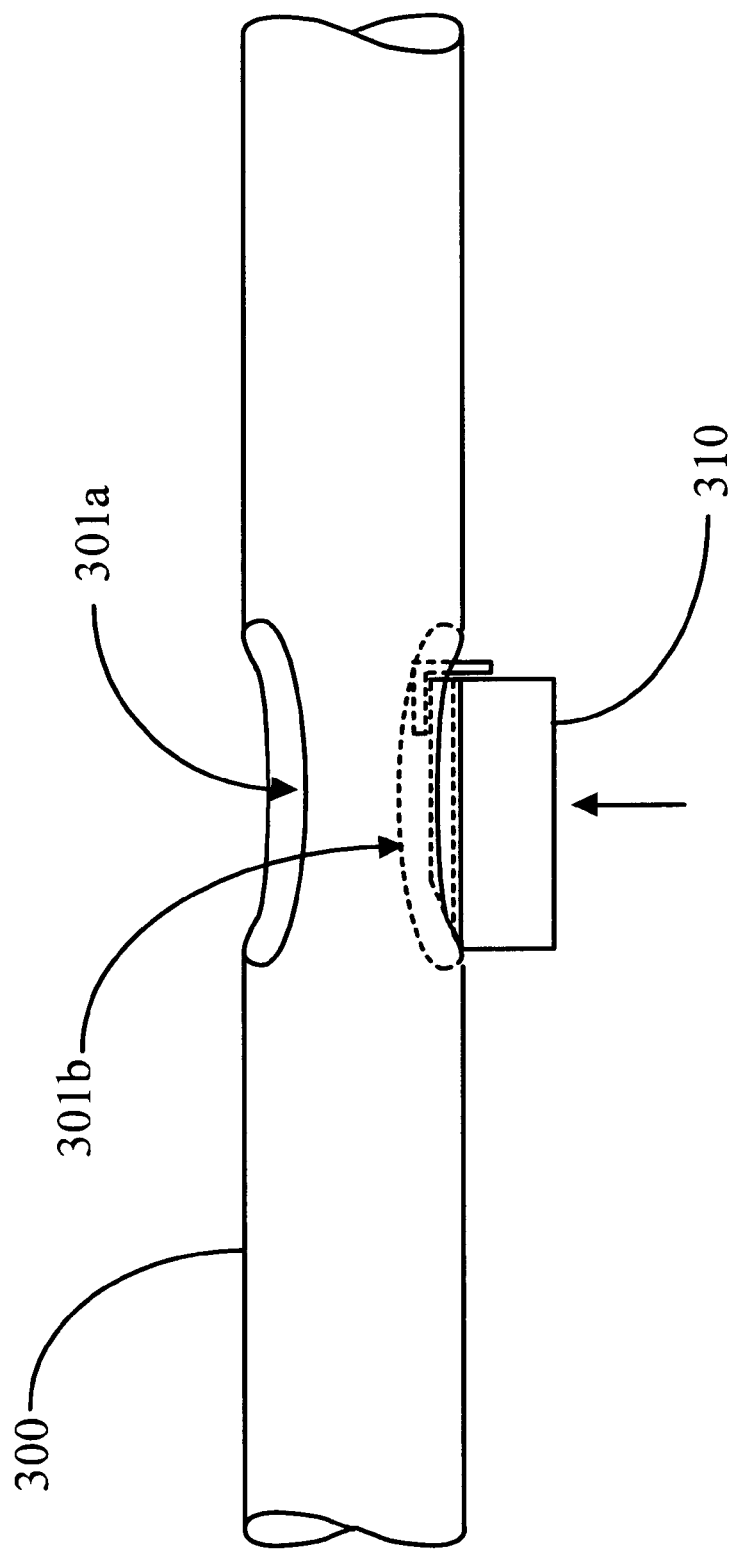
FIG. 3 is a view of a pre-formed fiber-optic cable in an embodiment of the invention.

FIG. 3 illustrates another aspect of the present invention, wherein an optical fiber 300 is preformed to accept one or more instances of active elements 310 and to form a workable optical interface, without cutting or breaking the fiber. In this aspect especially shaped indentions 301a and 301b are formed in fiber 300, in a shape to match the shape of elements of a non-invasive coupler. Such pre-formation may be done in any of several ways in the manufacturing process, such as by heat deformation, or by a machining process.

In this aspect such indentions are provided in a premanufactured fiber at repeating distances, such as once every three feet. In preferred cases cables may be marked on outer coverings to indicate the location of such indentions.

Although the elements 103 of structure 102 are shown as having layer 105 coplanar with upper and lower surfaces of the structure, in some embodiments the direction of layer 105 may be somewhat different to facilitate the interface with the fiber. Also, in some embodiments there may be just one active element in contact with a fiber shaped as in FIG. 3, and in other cases there may be more. For example, a unit may be provided that has laser elements to fit both of indentions 301a and 301b. In other cases there may be side-by-side elements as described in FIGS. 1 and 2.

Figure 5:
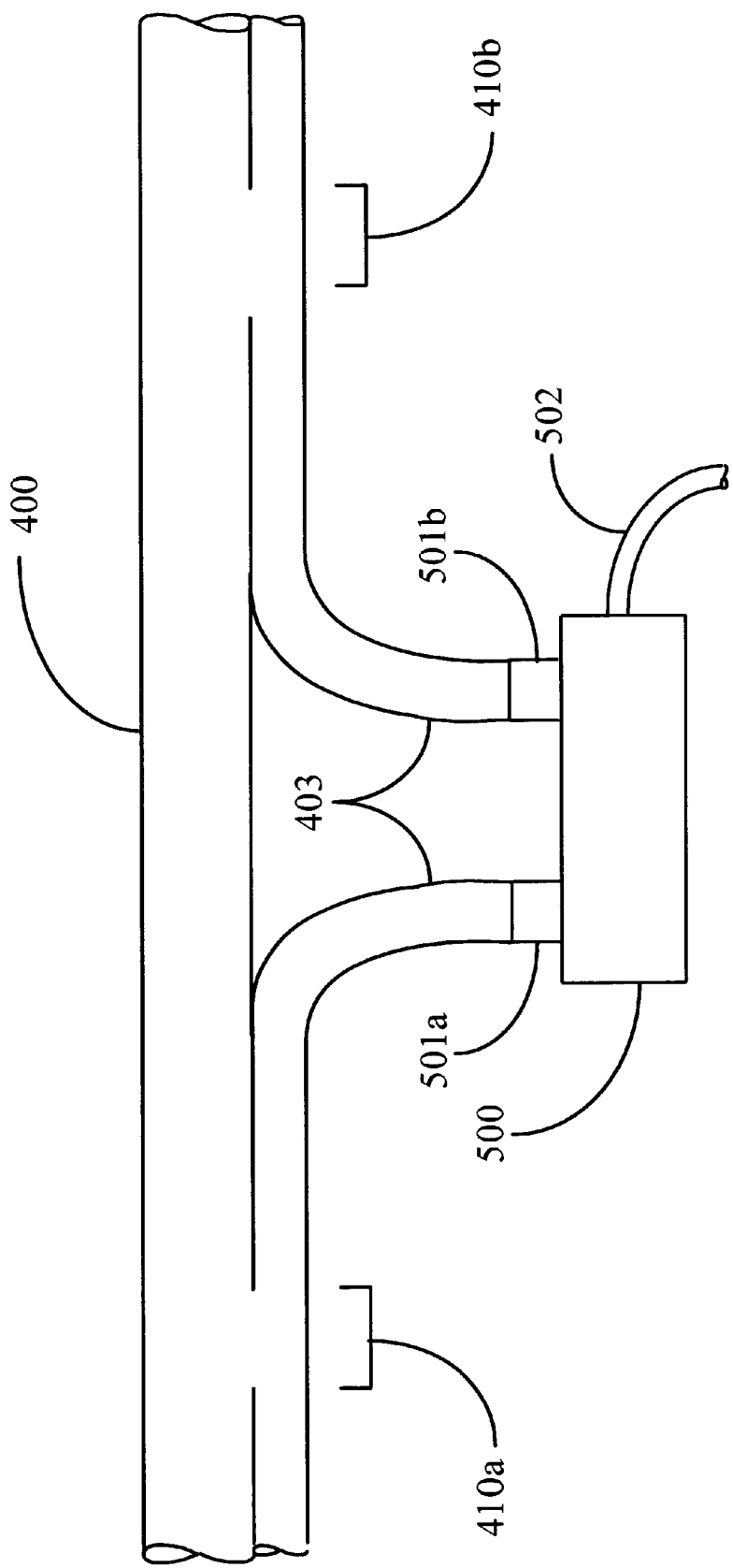
FIG. 5 is an illustration of a tap installed on the cable of FIG. 4a and 4b.

FIGS. 4a, 4b, and 5 illustrate yet another aspect of the present invention. FIG. 4a shows a cross-section of a new optics cable 406 having two separate portions 400 and 403. Portion 400 has a core 401 of a size to carry a relatively large number of optical fibers, such as 32, 48, 64, or 96. Joined portion 403 has a much smaller core 402 sized to carry just two optical fibers in some cases, a single one in other cases. In yet other cases, other numbers of fibers may be broken out, as a small subset of the main cable. In most applications two fibers are required to provide simultaneous two-way communication. Cable 406 has a common cover, and the two portions run parallel for the length of the cable.

FIG. 4b is a side view of a length of cable 406. Side-by-side portions 400 and 403 are illustrated. Also illustrated is a crossover region 410 where fibers from one region may cross into the other region. Crossover regions 410 are provided in a preferred embodiment at regular intervals along cable 406, such as at every ten feet of length. This distance may vary considerably in different embodiments.

The sharing of fibers between portions 400 and 403 is systematic in a preferred embodiment. For example, in a cable having 64 fibers, the fibers may be identified in 32 pairs 0 through 31. In a first length of the cable pair 0 may be in portion 403. At a first crossover point pair 0 goes back into portion 400, and pair 1 crosses into portion 403. At the next crossover region, pair 1 re-enters portion 400 and pair 2 enters portion 403. Crossovers follow this systematic pattern until all pairs have been in the small side region once, then the pattern repeats. This system provides that each fiber pair is isolated in the small side portion of the cable once in each 100 feet of cable. In a preferred embodiment the cable is marked for each length between crossover regions to identify which pair of fibers is isolated. In an alternative embodiment fiber wrapping may include a thin copper wire allowing testing from outside the main cable as to which of the fiber pairs is in the isolated side section. In yet other cases copper may be included on the isolated side to feed access point equipment with power from the head end.

In this fashion one may cut just the side portion 403 of the cable and thus break only an identifiable pair of fibers for interfacing to an interface unit. FIG. 5 shows a portion of cable 406 and two crossover regions 410a and 410b. In this situation it is known which fiber pair is in the smaller side portion 403. By cutting just the smaller side portion one may cut just the known fibers.

FIG. 5 illustrates the cable of FIG. 5 with side portion 403 cut and stripped away from portion 400 for a short distance in each direction from the cut position. The cut ends of region 403 are interfaced at points 501a and 501b to an interface unit 500. A side cable 502 to a home or business exits unit 500 carrying signals for the fiber pair interfaced to 500 from portions 403 of the main cable. Unit 500 may be a passive optical interface, whereby optical signals are continued in cable 502; or it may be an electrical interface, wherein the signals are converted between optical and electrical nature, and cable 502 carries electrical signals. In yet other cases it may be an active optical unit. In this aspect it is still necessary to cut and splice, but it is not necessary to cut and splice all of the fibers in the main cable each time an interface is to be made.

It will be apparent to the skilled artisan that there are many alterations that might be made in the embodiments described above without departing from the spirit and scope of the invention. For example, there are many ways force may be applied to accomplish the deformation needed in the embodiments described with the aid of FIGS. 1 and 2. There are similarly many options in the shape and sizes of the laser element and in how it may be manufactured. There are similarly many other alterations that may be made without departing from the spirit and scope of the invention. For these and other reasons the invention should be afforded the breadth of the claims which follow.

What is claimed is:

1. An optical cable for N fibers to enhance selectively coupling to individual fiber n-groups from the cable, where n<N, comprising:

a first core conducting N−n of the fibers;

a second core parallel to the first core, the second core at any point conducting n of the N fibers as a first n-group, the second core physically distinguishable from the first core; and crossover regions at regular intervals along the cable having openings between the cores wherein fiber n-groups may switch between the first core and the second core;

characterized in that at each crossover region proceeding in one direction, a n-group of fibers in the second core crosses over into the first core, and a different n-group of fibers crosses over from the first core to the second core.

2. The optical cable of claim 1 wherein, at each crossover region, a different n-group of fibers enters the second core, until all n-groups have been in the second core, and then the sequence repeats.

3. The optical cable of claim 2 wherein the cable is annotated in each region between crossover points, identifying the n-group pair in the region annotated.

4. The optical cable of claim 1 wherein each n-group is associated with an electrical conductor in a manner that all fiber n-groups may be identified from without the cable.

5. A method for facilitating selective coupling to individual fiber n-groups in an optical cable carrying N fibers in a plurality of fiber n-groups, where n<N, comprising the steps of:

(a) forming the cable with a first core conducting N−n of the fibers;

(b) forming a second core parallel to the first core, the second core at any point conducting n of the N fibers, the second core physically distinguishable from the first core;

(c) providing crossover regions at regular intervals along the cable, the crossover regions having an opening between the cores wherein fiber n-groups may cross over between the first core and the second core; and (d) crossing a n-group from the second core to the first core, and a different n-group of fibers from the first core to the second core, at each crossover point.

6. The method of claim 5 wherein at each crossover region a different n-group of fibers enters the second core, until all n-groups have been in the second core, and then the sequence repeats.

7. The method of claim 6 wherein the cable is annotated in each region between crossover points, identifying the n-groups in the region annotated.

* * * * *